United States Patent
Kimura et al.

(10) Patent No.: US 8,720,042 B2
(45) Date of Patent: May 13, 2014

(54) STATOR MANUFACTURING METHOD AND STATOR

(75) Inventors: Hideaki Kimura, Okazaki (JP); Hiroaki Urano, Miyoshi (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/582,634

(22) PCT Filed: Jun. 23, 2010

(86) PCT No.: PCT/JP2010/060634
§ 371 (c)(1),
(2), (4) Date: Sep. 4, 2012

(87) PCT Pub. No.: WO2011/161776
PCT Pub. Date: Dec. 29, 2011

(65) Prior Publication Data
US 2012/0319521 A1    Dec. 20, 2012

(51) Int. Cl.
*H02K 15/00* (2006.01)

(52) U.S. Cl.
USPC .................. 29/596; 29/597; 29/598; 310/195

(58) Field of Classification Search
USPC ..................... 29/596–598; 310/195
See application file for complete search history.

(56) References Cited

U.S. PATENT DOCUMENTS

| | | | | |
|---|---|---|---|---|
| 4,439,255 A * | 3/1984 | Imai et al. | ......... | 156/49 |
| 6,191,508 B1 * | 2/2001 | Aoki et al. | ......... | 310/45 |
| 6,943,466 B2 * | 9/2005 | Oohashi | ......... | 310/45 |
| 7,386,931 B2 * | 6/2008 | Neet et al. | ......... | 29/596 |
| 8,186,039 B2 * | 5/2012 | Kamakura et al. | ......... | 29/596 |
| 2009/0249613 A1 | 10/2009 | Takada et al. | | |
| 2011/0226508 A1 | 9/2011 | Aoi et al. | | |
| 2012/0319521 A1 * | 12/2012 | Kimura et al. | ......... | 310/195 |

FOREIGN PATENT DOCUMENTS

| | | |
|---|---|---|
| JP | 3618485 B2 | 2/2005 |
| JP | 3724665 B2 | 12/2005 |
| JP | 4177295 B2 | 11/2008 |
| JP | 2009-207306 A | 9/2009 |
| JP | 2009-273352 A | 11/2009 |
| JP | 2010055964 A | 11/2010 |
| WO | 2010/024359 A1 | 3/2010 |

OTHER PUBLICATIONS

Kyoichi Tsurusaki et al.: "Entanglement Effect on Polymer Crystallization", Research Report No. 11/2005, pp. 21-25, by Kanagawa National Institute of Advanced Industrial Science and Technology.

* cited by examiner

*Primary Examiner* — Minh Trinh
(74) *Attorney, Agent, or Firm* — Kenyon & Kenyon LLP

(57) ABSTRACT

A stator manufacturing method which manufactures an insulated conductor coil and mounts this coil to the core, the insulated conductor coil being formed by deforming an insulated conductor into a shape having rectilinear in-slot conductor sections and coil end sections having bent sections, the conductor having an enamel layer formed on the outer periphery thereof and also having an extruded resin coating layer formed on the outer periphery of the enamel layer, comprises: a first step of forming the conductor coil by deforming the conductor to form the bent sections while the coating layer of the conductor is in a non-crystalline resin state; a second step of heating the extruded resin coating layer of the conductor coil to change into a crystalline resin state to a temperature higher than or equal to the glass transition temperature; and a third step of mounting the conductor coil to the core.

6 Claims, 11 Drawing Sheets

S11: Wind-off Coil
S12: Straightening Roller
S13: Heat In-slot Conductor Portion, Cool Coil End Portion
S14: Deform to Form Bent Portion
S15: Assemble Insulated Conductor Coil
S16: Mount to Core
S17: Heat Coil End Portion and Terminal Portion
X: Amorphous
Y: Only In-slot Conductor Portion in Crystalline
Z: All Portions in Crystalline

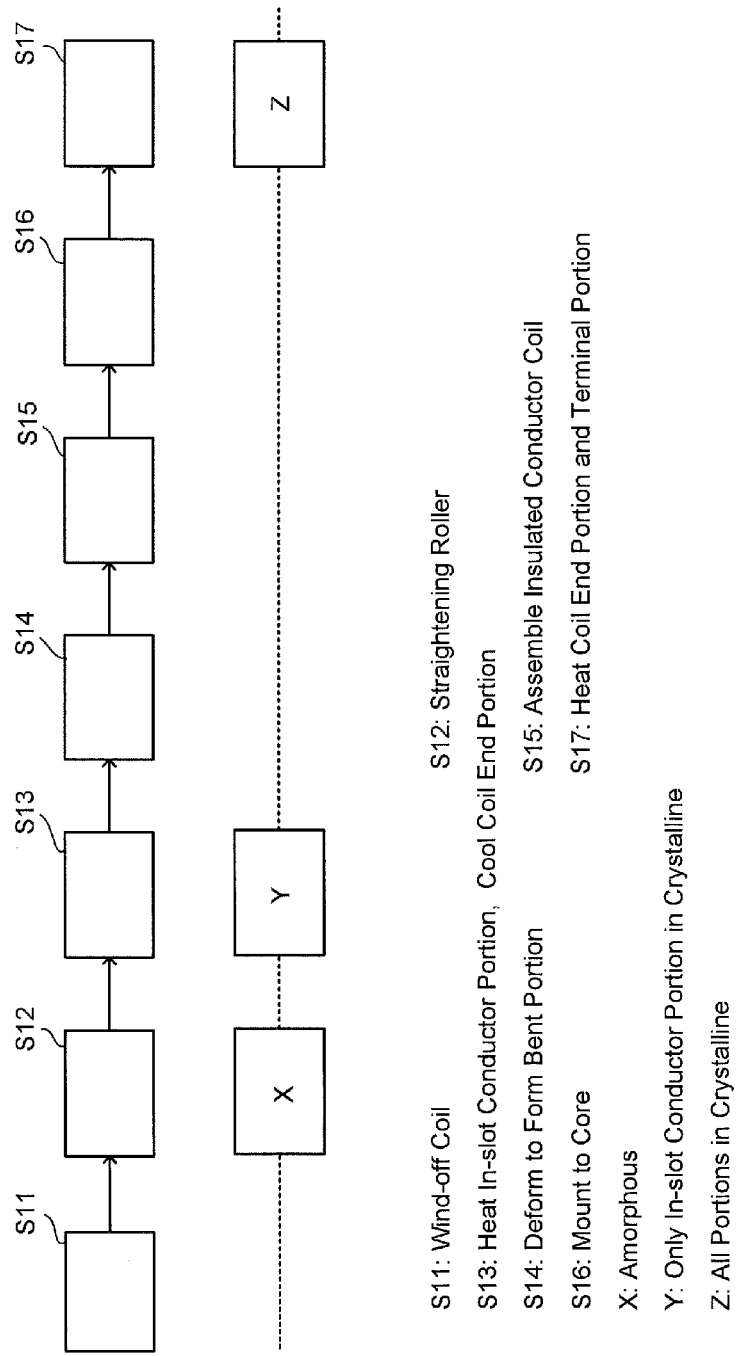

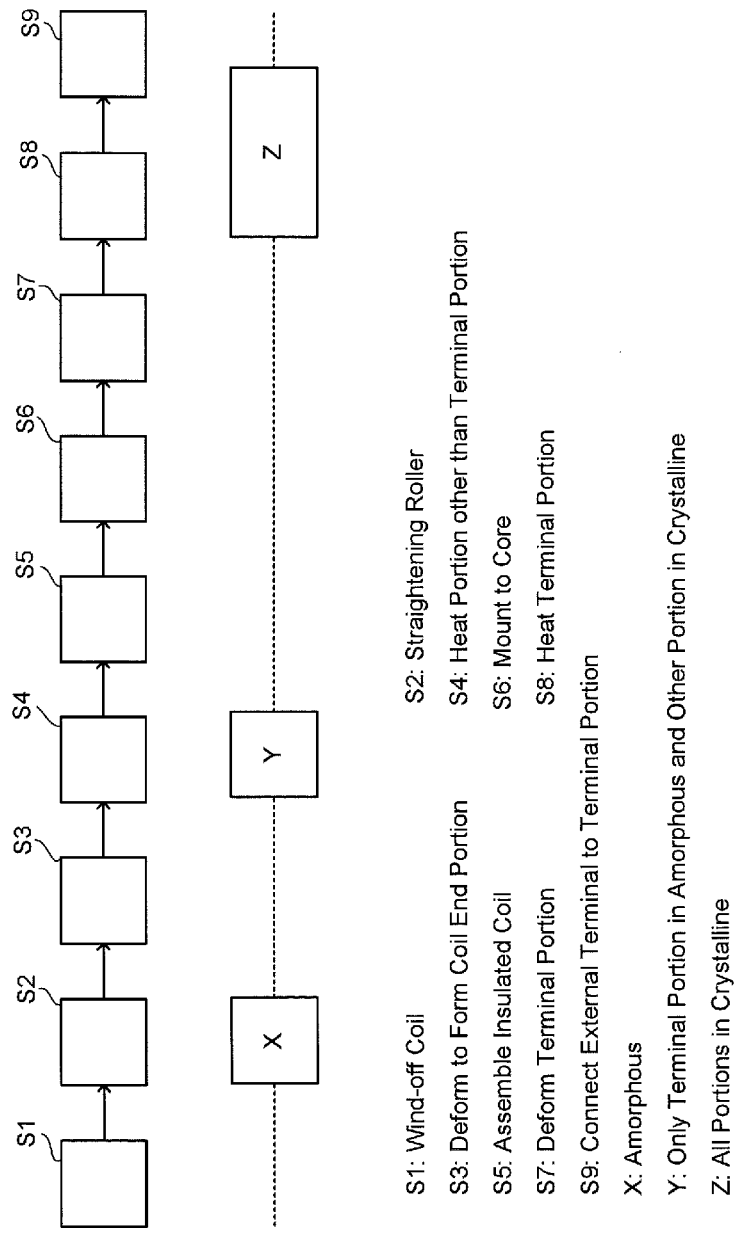

FIG. 12

S1: Wind-off Coil
S2: Straightening Roller
S3: Deform to Form Coil End Portion
S4: Heat Portion other than Terminal Portion
S5: Assemble Insulated Coil
S6: Mount to Core
S7: Deform Terminal Portion
S8: Heat Terminal Portion
S9: Connect External Terminal to Terminal Portion
X: Amorphous
Y: Only Terminal Portion in Amorphous and Other Portion in Crystalline
Z: All Portions in Crystalline Relationship in Thickness of Coating
Between Before and After Heat Treatment

US 8,720,042 B2

STATOR MANUFACTURING METHOD AND STATOR

CROSS-REFERENCE TO RELATED APPLICATIONS

This is a 371 national phase application of PCT/JP2010/060634 filed on Jun. 23, 2010, the entire contents of which are incorporated herein by reference.

FIELD OF THE INVENTION

The present invention relates to a stator manufacturing method of manufacturing a stator in such a manner that an insulated conductor having an enamel layer formed on an outer periphery of a conductor (wire) and an extruded resin coating layer formed on an outer periphery of the enamel layer is deformed into a shape having straight in-slot conductor portions and coil end portions having bent portions to produce an insulated conductor coil, and then the insulated conductor coil is mounted to a core.

BACKGROUND OF THE INVENTION

In an enamel wire having an enamel layer baked on the outer periphery of a conductor, the enamel layer needs to have a thickness of 60 μm or more against partial discharge degradation. However, a problem occurs when the baking thickness per baking is set large, air bubbles are left in the enamel layer due to volatilization and bubble release in a solvent of varnish. On the other hand, when the baking thickness per baking is set small and the number of bakings is increased, the contact strength between the conductor and the enamel layer is deteriorated.

As a means to solve the above problems by increasing the coating thickness of an insulation layer and also enhancing joining strength of the enamel layer, Patent Document 1 proposes an inverter surge resistant insulated wire made by forming at least one enamel baking layer on an outer periphery of a conductor and forming at least one extruded resin coating layer on the outside thereof.

In Patent Document 1, thermoplastic resin is mainly used. Specifically, Patent Document 1 discloses that electric wires coated with various kinds of thermoplastic resin are produced and subjected to evaluations of abrasion resistance (room temperature), heat-resistance senescence characteristic (180° C.), and resistance to solvents as shown in Table 2.

On the other hand, Patent Document 2 discloses a method of manufacturing a stator by producing a cage-shaped insulated conductor coil by shaping an enamel flat rectangular wire having an enamel layer formed on an outer periphery of a flat conductor into straight in-slot conductor portions and coil end portions having bent portions, and then mounting the cage-shaped insulated conductor coil to a core.

In conventional stators, a voltage difference between the in-slot conductor portions located in adjacent slots is small and thus the enamel layer alone can provide sufficient insulation. In the coil end portion, however, three-phase currents are complicated, increasing a voltage difference between conductors, and thus the enamel layer alone cannot provide sufficient insulation. For this reason, an insulation interphase sheet is used to ensure insulation.

However, inserting the insulation interphase sheet between the coil end portions requires complicated operation, resulting in cost increase. To solve this problem, the use of the inverter surge resistant insulated wire has been investigated to ensure insulation in the coil ends and eliminate the use of the insulation interphase sheet.

RELATED ART DOCUMENTS

Patent Documents

Patent Document 1: Japanese Patent No. 4177295
Patent Document 2: JP-A-2009-273352

SUMMARY OF INVENTION

Problems to be Solved by the Invention

However, Patent Document 1 discloses the insulated conductor but fails to disclose that the insulated conductor is deformed into a wave winding form, a circular winding form, and others, to produce the insulated conductor coil and that the insulated conductor coil is mounted to the core to manufacture the stator.

Actually, for example, as shown in Patent Document 2, the insulated conductor coil has to be produced by deforming the insulated conductor (an edgewise coil) such as an enamel flat rectangular wire into the form having the straight in-slot conductor portions and the coil end portions with the bent portions. At that time, in the bent portions, cracks occur in the extruded resin coating layer, which may cause insulation failures.

It is conceived that the cracks occur in the extruded resin coating layer because the extruded resin coating layer is in a crystalline resin state having high rigidity and thus cannot withstand deforming.

The inventors experimentally confirmed that the above problems can be solved by performing bending operation while the extruded resin coating layer is in an amorphous or non-crystalline resin state without being crystalline, and proposes this feature in claim 1. Specifically, immediately after coating resin is extruded from an extrusion molding machine, the extruded resin coating layer is soft. Thus, when the coating is rapidly cooled into an amorphous resin state at that time, there is no possibility that cracks occur in the coating layer in the bending operation.

On the other hand, after the insulated conductor coil formed is mounted to the core, the extruded resin coating layer needs to be heated to a crystalline resin state. This is because PPS resin in the crystalline resin state has a higher breakdown voltage by 20% or more than in the amorphous resin state. Heat resistance is also enhanced. These are advantageous to motor or other products that highly need to increase the breakdown voltage and enhance heat resistance.

Herein, in the case where the insulated conductor coil is mounted to the core and then heated, the extruded resin coating layers in the slots where the extruded resin coating layers are in contact with each other (the layers press against each other) are heated to a temperature higher than or equal to a glass transition temperature, the resin is softened, thus decreasing the coating thickness of the extruded resin coating layers due to mutual pressing force.

FIG. 14 shows experimental results about decrease in coating thickness of the extruded resin coating layer. Before heating, the thickness XA of the layer in the amorphous state was 200 μm. After heating, the thickness XB was 165 μm. This shows that the thickness of the extruded resin coating layer was decreased by as much as 17.5%. This decreased thickness of the extruded resin coating layer deteriorates insulation.

In the case of the crystalline resin state, on the other hand, the thickness YA of 224 μm before heating was merely decreased to the thickness YB of 220 μm after heating. A decrease ratio of the thickness of the extruded resin coating layer could be held to 2% or less, so that sufficient insulation property could be ensured. This was experimentally confirmed by the present inventors.

When a wave winding coil is to be formed with a small coil diameter, an insulated conductor is largely deformed in coil end portions when wound into a cage shape. This may cause cracks in the extruded resin coating layers of the coil end portions. As long as the extruded resin coating layers of the coil end portions are rendered into the amorphous resin state, cracks are occur in the extruded resin coating layers of the coil end portions.

Therefore, the present inventors proposes claim 2 reciting a means for solving the above problems.

On the other hand, the present inventors made experiments by deforming an insulated conductor while keeping an amorphous resin state to manufacture an insulated conductor coil and, before the coil was mounted to a core, heating the entire insulated conductor coil to a temperature higher than or equal to a glass transition temperature to a crystalline resin state (an experiment related to an invention in claim 1). However, since a terminal portion had to be deformed after the insulated conductor coil was mounted to the core, when a resin layer of an insulated conductor forming the terminal portion was rendered into the crystalline resin state, cracks occurred in that deformed portion. The present inventors propose claim 4 as a means for solving this problem.

The present invention has been made to solve the above problems and has a purpose to provide a method of manufacturing a stator in which there is no possibility that cracks occur in an extruded resin coating layer, Means of Solving the Problems To achieve the above purpose, one aspect of the invention provides the following configurations.
(1) In a method of manufacturing a stator in such a manner that an insulated conductor having an enamel layer on an outer periphery of a conductor and an extruded resin coating layer on an outer periphery of the enamel layer is deformed into a shape having straight in-slot conductor portions and coil end portions having bent portions to produce an insulated conductor coil, and the insulated conductor coil is mounted to a core, the method comprises: a first step of forming the insulated conductor coil by deforming the insulated conductor to form the bent portions while the extruded resin coating layer of the insulated conductor is in an amorphous resin state; a second step of heating the extruded resin coating layer of the insulated conductor coil to a temperature higher than or equal to a glass transition temperature to render the extruded resin coating layer into a crystalline resin state; and a third step of assembling the insulated conductor coil to the core; as a stage before the first step, a previous step of forming the extruded resin coating layer of the in-slot conductor portions in the crystalline resin state and forming the extruded resin coating layer of the coil end portions in the amorphous resin state, wherein the first step includes deforming the coil end portions in the amorphous resin state.

Resin roughly falls into two states; one is a state where polymer molecules are arranged in regular order and the other is a state where polymer molecules exist in ball-like structure or tangled structure. The former is called a crystalline state and the latter is called an amorphous state. In this manner, resin is classified into crystalline resin and amorphous resin depending on an arrangement state of polymer molecules. In actually existing resin, not all portions are in the crystalline state. Even the crystalline resin contains both crystalline portions and amorphous portions. A ratio of the crystalline portions in resin is expressed by a numerical value called crystallinity degree:

(Crystallinity Degree)=(Crystalline region)/(Sum of Crystalline region and Amorphous region).

In the present example, the crystalline resin state represents a state exhibiting high crystallinity degree and the amorphous resin state represents a state exhibiting low crystallinity degree.

(2) In the stator manufacturing method described in (1), preferably, after the insulated conductor coil is mounted to the core, the extruded resin coating layer of the coil end portions is heated to a temperature higher than or equal to a glass transition temperature to render the extruded resin coating layer into the crystalline resin state.
(Deleted)
(3) In the stator manufacturing methods described in (1) or (2), preferably, the extruded resin coating layer is heated by an induction coil to change into the crystalline resin state and simultaneously cooled by a heatsink or a water jacket to keep the amorphous resin state.
(4) In the stator manufacturing methods described in (1) or (2), preferably, the extruded resin coating layer is heated by a laser beam to change into the crystalline resin state.

Another aspect of the invention provides a stator configured as below.
(5) The stator is manufactured by the stator manufacturing methods described in (1) to (4).

Effects of the Invention

The aforementioned stator manufacturing method can exhibit the following operations and advantageous effects.
(1) In a method of manufacturing a stator in such a manner that an insulated conductor having an enamel layer on an outer periphery of a conductor and an extruded resin coating layer on an outer periphery of the enamel layer is deformed into a shape having straight in-slot conductor portions and coil end portions having bent portions to produce an insulated conductor coil, and the insulated conductor coil is mounted to a core, the method comprises: a first step of forming the insulated conductor coil by deforming the insulated conductor to form the bent portions while the extruded resin coating layer of the insulated conductor is in an amorphous resin state; a second step of heating the extruded resin coating layer of the insulated conductor coil to a temperature higher than or equal to a glass transition temperature to render the extruded resin coating layer into a crystalline resin state; and a third step of assembling the insulated conductor coil to the core.

Accordingly, in the deforming operation in the first step, the coil end portions being in the amorphous resin state and thus flexible are less likely to be cracked or broken in bending operation.

When resin is heated and cooled, its state is changed into a crystalline state or an amorphous state. When heated, the motion of polymer chains in the amorphous portion becomes active and the crystalline portion solves. In the crystalline resin and the amorphous resin, their molecular motions in the amorphous portion are active at a temperature, called a glass transition temperature, or higher, and their rigidity deteriorates as the crystalline portions solve.

PPS (polyphenylene sulfide) and PEEK (polyether ether ketone) are crystalline resins. The present inventors experimentally confirmed that PPS resins are high in rigidity and brittle in the crystalline resin state but are flexible in the amorphous resin state.

(2) The stator manufacturing method described in (1) further includes, as a stage before the first step, a previous step of forming the extruded resin coating layer of the in-slot conductor portions in the crystalline resin state and forming the extruded resin coating layer of the coil end portions in the amorphous resin state, wherein the first step includes deforming the coil end portions in the amorphous resin state. Since the coil end portions are in the amorphous resin state and thus flexible, there is no possibility that cracks or breakage occur when the coil end portions are bent. Furthermore, the coil end portions are in the amorphous resin state, so that the extruded resin coating layer of the coil end portions is less likely to be cracked when a wave winding coil is wound in a cage shape having a small coil diameter.

(3) In the stator manufacturing method described in (2), after the insulated conductor coil is mounted to the core, the extruded resin coating layer of the coil end portions is heated to a temperature higher than or equal to a glass transition temperature to render the extruded resin coating layer into the crystalline resin state. Since the in-slot conductor portions are rendered in advance into the crystalline resin state, accordingly, a decrease ratio of the thickness of the in-slot conductor portions can be reduced to 2% or less even when the in-slot conductor portions are heated. This can provide sufficient insulation property.

(4) In the stator manufacturing method described in (1), the second step includes heating a portion of the extruded resin coating layer of the insulated conductor coil other than a terminal portion to a temperature higher than or equal to the glass transition temperature to render the heated portion of the extruded resin coating layer into the crystalline resin state, and the third step includes deforming the terminal portion after the insulated conductor coil is mounted to the core, and then heating the deformed terminal portion to a temperature higher than or equal to the glass transition temperature to render the terminal portions into the crystalline resin state. In the deforming operation in the first step, the coil end portions being in the amorphous resin state and thus flexible are less likely to be cracked or broken in the bending operation. In the deforming operation of the external terminal portion in the third step, the external terminal portion being in the amorphous resin state and thus flexible is less likely to be cracked or broken in the bending operation.

(5) In the stator manufacturing method described in one of (1) to (4), the extruded resin coating layer is heated by an induction coil to change into the crystalline resin state and simultaneously cooled by a heatsink or a water jacket to keep the amorphous resin state. It is therefore possible to heat only the in-slot conductor portions without heating the coil end portions. Only the in-slot conductor portions can be surely rendered into crystalline resin while the coil end portions are kept in amorphous resin.

(6) In the stator manufacturing method described in one of (1) to (4), the extruded resin coating layer is heated by a laser beam to change into the crystalline resin state. It is therefore possible to heat only the in-slot conductor portions without heating the coil end portions. Only the in-slot conductor portions can be surely rendered into crystalline resin while the coil end portions are kept in amorphous resin.

BRIEF DESCRIPTION OF THE DRAWINGS

FIG. 1 is a process chart showing a first example of a stator manufacturing method;

FIG. 12 is a process chart showing a second example of the stator manufacturing method;

DETAILED DESCRIPTION

A detailed description of one example of a stator manufacturing method of the present invention will now be given referring to the accompanying drawings. FIG. 1 is a process chart showing the first example of the stator manufacturing method.

An insulated conductor (an inverter surge resistant insulated wire) having an enamel layer baked on the outer periphery of a conductor and an extruded resin coating layer formed on the outer periphery of the enamel layer is supplied, as being wound on a wind-off coil, to a manufacturing line (S11). In this example, an extruded resin coating layer is made of PPS resin which is one kind of crystalline resin. As an alternative, PEEK which is also crystalline resin may be used. The thickness of the extruded resin coating layer is several tens of μm. The extruded resin coating layer of the insulated conductor wound on the wind-off coil is in an amorphous state. That is, when molten PPS resin is applied on an enamel layer by an extrusion die and dried as it is, the PPS resin is in an amorphous resin state. PPS resin is inherently crystalline resin. However, at the time when the resin is formed into a coating by extrusion molding, the resin is in an amorphous resin state with a low crystallinity degree. Normally, after extrusion molding, the resin is heated to a temperature higher than or equal to a glass transition temperature to change into a crystalline resin state. In the present example, in contrast, the resin kept in the amorphous resin state.

The "crystalline resin state" and the "amorphous resin state" defined in the present example are explained below.

Not all actually existing resins are in a crystalline state. Crystalline resin also contains a crystalline portion and an amorphous or non-crystalline portion. A ratio of the crystalline portion in resin is expressed by a numeral called crystallinity degree, which is expressed by:

(Crystallinity Degree)=(Crystalline region)/(Sum of Crystalline region and Amorphous region).

In the present example, the crystalline resin state represents a state exhibiting a high crystallinity degree and the amorphous resin state represents a state exhibiting a low crystallinity degree. In the present example, an edgewise coil having a flat rectangular cross section is used as the conductor. The insulated conductor wound off from the wind-off coil passes between straightening rollers to remove curling or the like resulting from a wound state on the wind-off coil (S12).

Subsequently, in-slot conductor portions 11B of the insulated conductor are heated to a temperature higher than or equal to a glass transition temperature by use of induction heating coils 13 serving as heating means. The period of time for heating is determined in a range of several seconds to several tens of seconds. Simultaneously, coil end portions 11A and a terminal portion 11S are cooled by water jackets 12 serving as cooling means (S13).

Figure 2A:
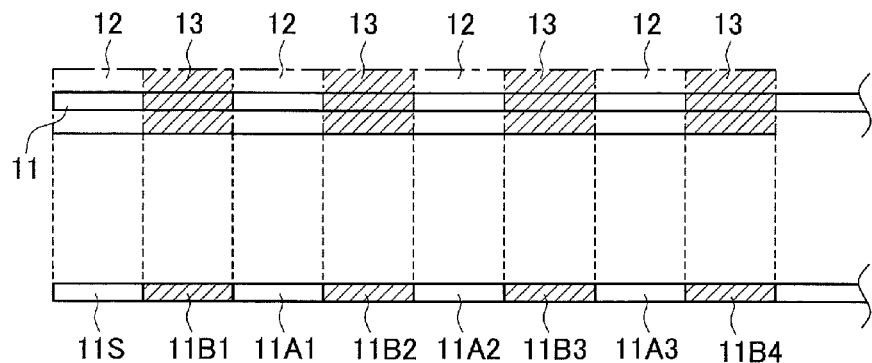
FIG. 2A is a diagram showing that a conductor is subjected to heat treatment different between coil end portions and in-slot conductor portions and to deforming.

As shown in FIG. 2A, the insulated conductor 11 includes, at its end, the terminal portion 11S making a part of a coil end, and in-slot conductor portions 11B and coil end portions 11A alternately arranged in a cyclic pattern. Herein, the coil end portions 11A represent insulated conductor portions to be located on the outside of slots of a stator core in a completed stator. The in-slot conductor portions 11B represent insulated conductor portions to be mounted in the slots of the stator core in the completed stator. Furthermore, the terminal portion 11S represents a portion to be located in the coil end when the insulated conductor coil is mounted to the stator core and then to be deformed and connected to a bus bar, an external terminal, etc.

In a wave winding coil, the coil end portions 11A are designed so that a coil end portion 11A located at a more outer circumferential side is longer in length. This complies with the circumferential length of the coil being longer at a more outer circumference. The in-slot conductor portions 11B are basically equal in length to each other.

Figure 8:
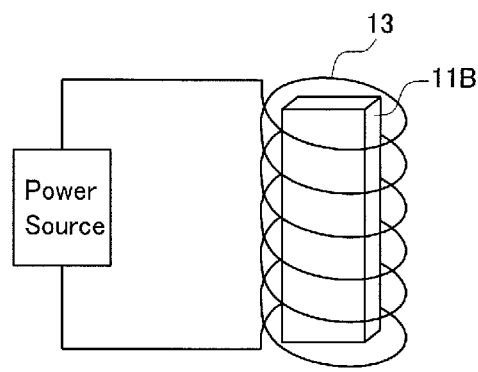
FIG. 8 is a diagram showing an induction heating coil.

In the present example, the induction heating coil 13 shown in FIG. 8 is used as the heating means and the water jacket 12 is used as the cooling means. When energized, the induction heating coil 13 generates magnetic flux, thereby generating induced current in the in-slot conductor portion 11B and generating heat. The magnetic flux acts on not only the in-slot conductor portion 11B but also the coil end portion 11A, thereby generating heat in the coil end portion 11A. In the present example, the water jackets 12 are used to keep the temperature of the coil end portions 11A and terminal portion 11S lower than the glass transition temperature. Specifically, using the induction heating coils 13 and the water jackets 12 arranged adjacently is to heat only the in-slot conductor portions 11B without heating the coil end portions 11A and the terminal portion 11S. The water jackets 12 used in the present example may be replaced by heat sinks.

By simultaneous usage of the induction heating coils 13 and the water jackets 12, only the in-slot conductor portions 11B can be heated for a predetermined time ranging from several seconds to several tens of seconds at about 90° C. or higher which is a glass transition temperature of PPS resin. In addition, this can prevent the coil end portions 11A and the terminal portion 11S from being heated to a high temperature exceeding the glass transition temperature.

Accordingly, the extruded resin coating layer on the outer periphery of each in-slot conductor portion 11B changes into a crystalline resin state, whereas the extruded resin coating layer on the outer periphery of each of the coil end portions 11A and the terminal portion 11S remain in an amorphous resin state.

Figure 9:
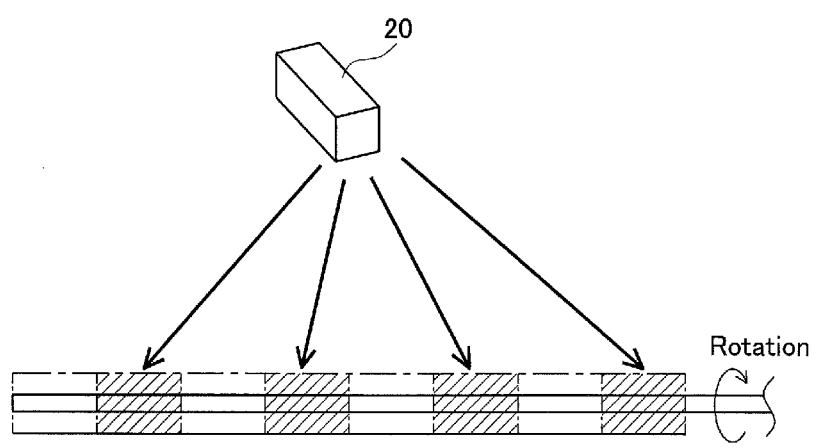
FIG. 9 is a diagram showing heating by a laser beam.

Although the present example uses the induction heating coils 13 as the heating means, an alternative is to use a heating laser 20 to heat the extruded resin coating layer of each in-slot conductor portion 11B to the glass transition temperature by a laser beam as shown in FIG. 9. In this case, the conductor 11 is rotated so that the extruded resin coating layer formed on the outer periphery of each in-slot conductor portion 11B is heated uniformly. Heating by the laser beam can increase a temperature intensively in a short time, so that the temperature of the coil end portions 11A does not increase to the glass transition temperature even without using the cooling means 12. Thus, costs of equipment or facilities can be reduced.

Figure 10:
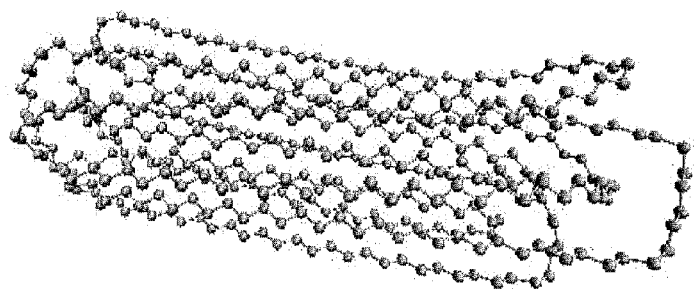
FIG. 10 is a conceptual diagram showing a binding state of molecules in a crystalline resin state.
Figure 11:
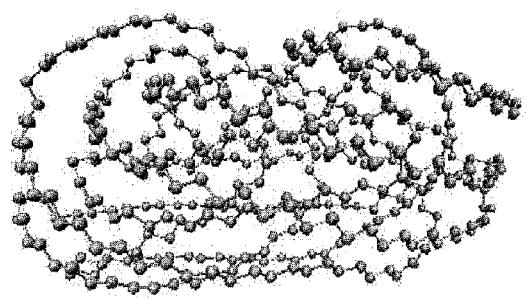
FIG. 11 is a conceptual diagram showing a binding state of molecules in an amorphous sate.

FIG. 10 is a conceptual diagram showing a binding state of molecules in the crystalline resin state. FIG. 11 is a conceptual diagram showing a binding state of molecules in the amorphous resin state. FIGS. 10 and 11 are disclosed in "Entanglement Effect on Polymer Crystallization", Kyoichi TSURUSAKI and Sayaka TAKEUCHI (Research report No. 11/2005, p. 21-25, by Kanagawa National Institute of Advanced Industrial Science and Technology).

In the crystalline resin state, as shown in FIG. 10, molecules are regularly arranged and thus tend to cause volume contraction, make a coating hard and brittle. In contrast, in the amorphous resin state, as shown in FIG. 11, molecules are randomly arranged and thus make a coating relatively soft, exhibiting flexibility.

In actually existing PPS resin, not all portions thereof are in the crystalline state. Even the crystalline resin contains both crystalline portions and amorphous portions. A ratio of the crystalline portions in resin is expressed by a numerical value called crystallinity degree, which is expressed by:

(Crystallinity Degree)=(Crystalline region)/(Sum of Crystalline region and Amorphous region).

In the present example, the crystalline resin state represents a state exhibiting a high crystallinity degree and the amorphous resin state represents a state exhibiting a low crystallinity degree. Accordingly, if the in-slot conductor portions 11B each having the extruded resin coating layer in the crystalline resin state are bent at sharp angles, cracks may occur in the extruded resin coating layer. In contrast, even when the coil end portions 11A and the terminal portion 11S each having the extruded resin coating layer in the amorphous resin state are bent at sharp angles, there is no possibility that cracks occur in the extruded resin coating layers.

Figure 2B:
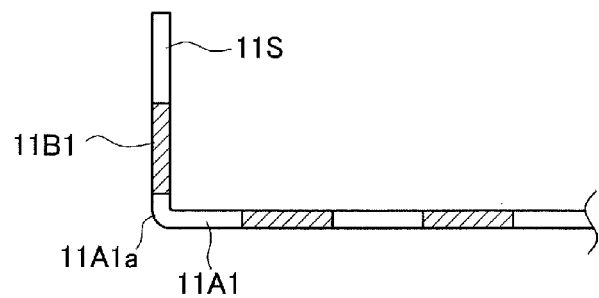
FIG. 2B is a diagram showing that the conductor is subjected to heat treatment different between coil end portions and in-slot conductor portions and to deforming.
Figure 2C:
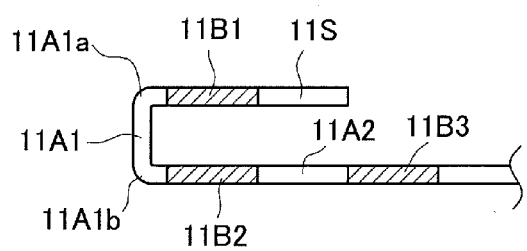
FIG. 2C is a diagram showing that the conductor is subjected to heat treatment different between coil end portions and in-slot conductor portions and to deforming.
Figure 2D:
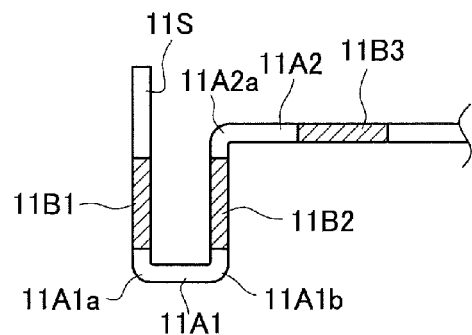
FIG. 2D is a diagram showing that the conductor is subjected to heat treatment different between coil end portions and in-slot conductor portions and to deforming.
Figure 3:
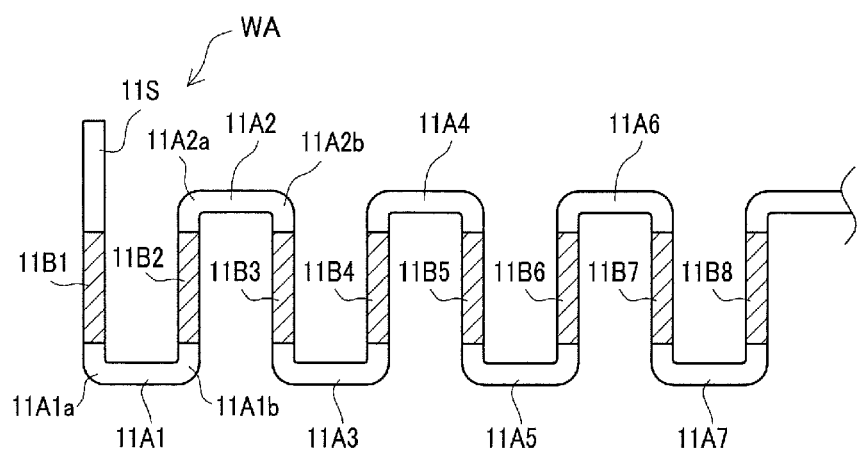
FIG. 3 is a diagram showing the shape of the conductor after subjected to deforming.
Figure 4:
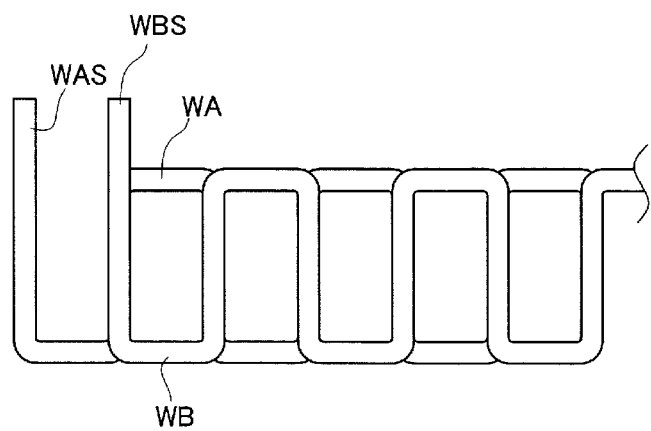
FIG. 4 is a diagram showing a state where wave winding coils are assembled to overlap one on the other.

Subsequently, the coil end portions 11A are subjected to a bending operation. Specifically, as shown in FIG. 2B, a coil end portion 11A1 is bent at a point near an in-slot conductor portion 11B1 to form a bent portion 11A1a. As shown in FIG. 2C, the coil end portion 11A1 is then bent at a point near an in-slot conductor portion 11B2 to form a bent portion 11A1b. Further, a coil end portion 11A2 is bent at a point near the in-slot conductor portion 11B2 to form a bent portion 11A2a as shown in FIG. 2D (S14). In the above sequential bending operation, the in-slot conductor portions 11B are not deformed while only the coil end portions 11A are bent, producing a wave winding coil WA as shown in FIG. 3. This coil WA makes a part of a W-phase coil, one of three phases constituting a motor. FIG. 4 shows a state where the wave winding coils WA and WB are assembled to overlap one on the other. Accordingly, a coil to surround teeth of a stator core is produced.

Figure 5:
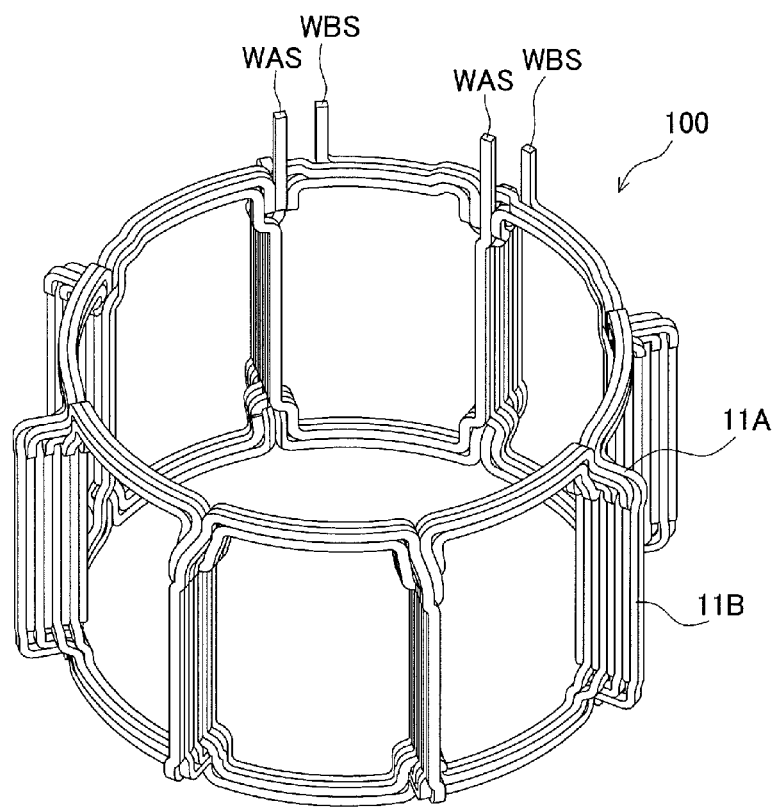
FIG. 5 is a diagram showing a state where the wave winding coils are wound in a cage shape.

FIG. 5 shows a state where the wave winding coils WA and WB are wound together into a cage shape. The coil end portions 11A partly include largely deformed portions by bending operation. On the other hand, the in-slot conductor portions 11B are maintained in a straight form. Terminal portions WAS and WBS are placed upright in the coil end.

The extruded resin coating layer of each coil end portion 11A is in an amorphous resin state and thus has flexibility. Accordingly, even when the coil end portions 11A are bent at about 90° as shown in FIG. 5, the layer is not cracked or broken in the bending operation.

Figure 6:
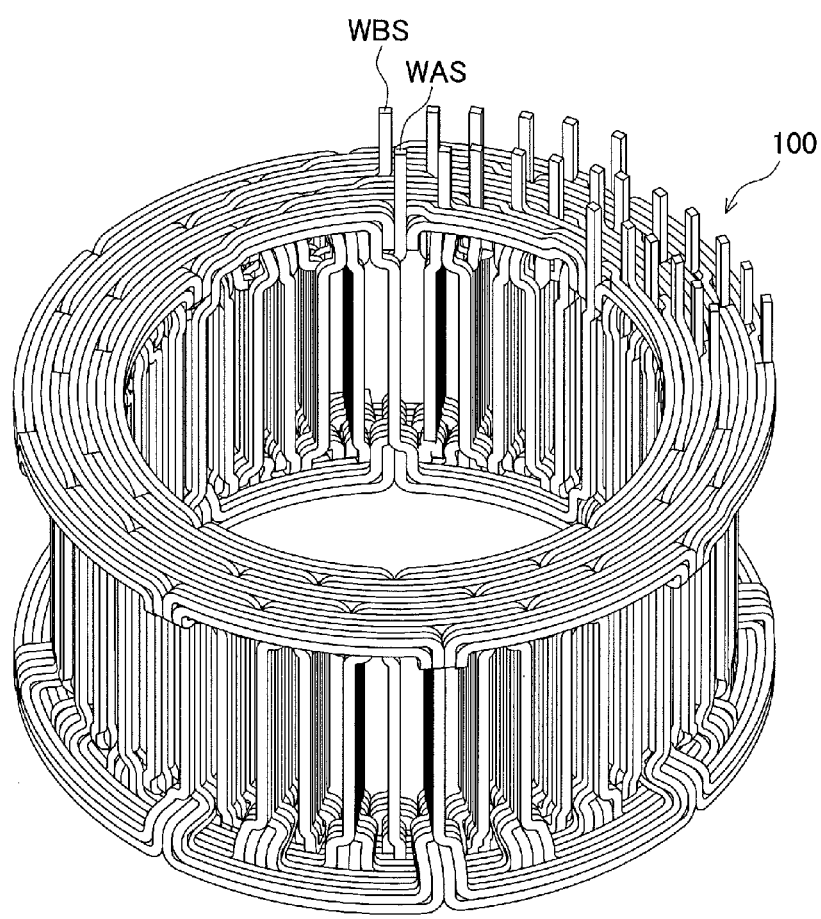
FIG. 6 is a diagram showing an insulated conductor coil in a state where all of W-phase, V-phase, and U-phase wave winding coils are wound in a cage shape.

FIG. 6 shows an insulated conductor coil 100 in a state where the W-phase wave winding coils WA and WB, V-phase wave winding coils, and U-phase wave winding coils are wound up together in a cage shape. In this state, the terminal portions WAS and WBS of each wave winding coil and others are located in upright state in the coil end. A step of winding up the insulated conductor coil 100 is an insulated conductor coil assembling step S15.

Figure 7:
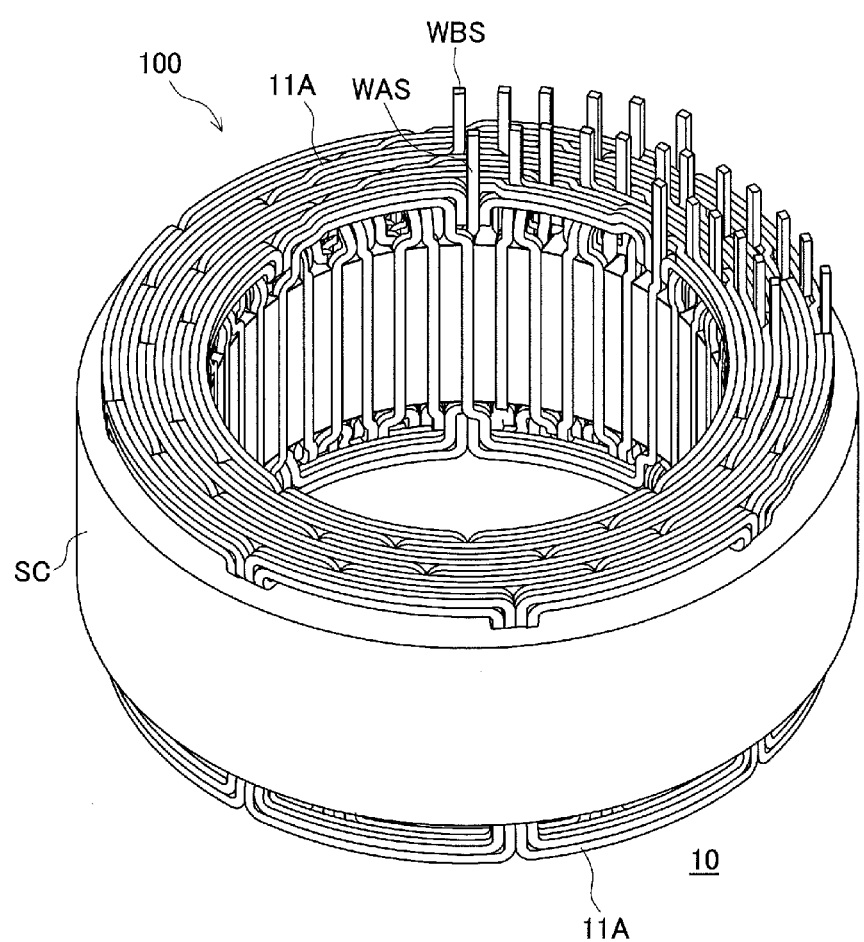
FIG. 7 is a diagram showing a stator in which a split stator core is mounted to the insulated conductor coils from outer periphery and fixed by a shrink fit ring.

FIG. 7 shows a stator 10 produced by mounting a split stator core to the insulated conductor coil 100 from its outer periphery and then fitting a shrink fit ring SC to fix the stator core. In this state, the terminal portions WAS, WBS, and others are not sill connected. This step is a core assembling step S16.

Subsequently, even though it is not shown, the terminal portions WAS, WBS and others are bent and connected to a bus bar and external connecting terminals. Then, the coil end portions 11A and the terminal portions WAS, WBS, and others are subjected to heat treatment (S17). Specifically, by using the induction heating coils 13 or the laser 20, the coil end portions 11A and the terminal portions WAS and others, which are located outside the stator core, are heated to a temperature equal to or higher than about 90° C. which is the glass transition temperature of PPS. Thus, all portions of the extruded resin coating layer of the insulated conductor including the coil end portions 11A and the terminal portions WAS, WBS, and others, change into a crystalline resin state.

In the case where the insulated conductor coil is mounted to the core and then heated, when the extruded resin coating layer located in the slots in which the extruded resin coating layer portions are in close contact with each other (the layer portions are pressed against each other) are heated to a temperature equal to or higher than about 90° C. which is the glass transition temperature, the resin is softened, resulting in a problem that the coating thickness of the extruded resin coating layer is decreased due to mutual pressing force.

Figure 14:
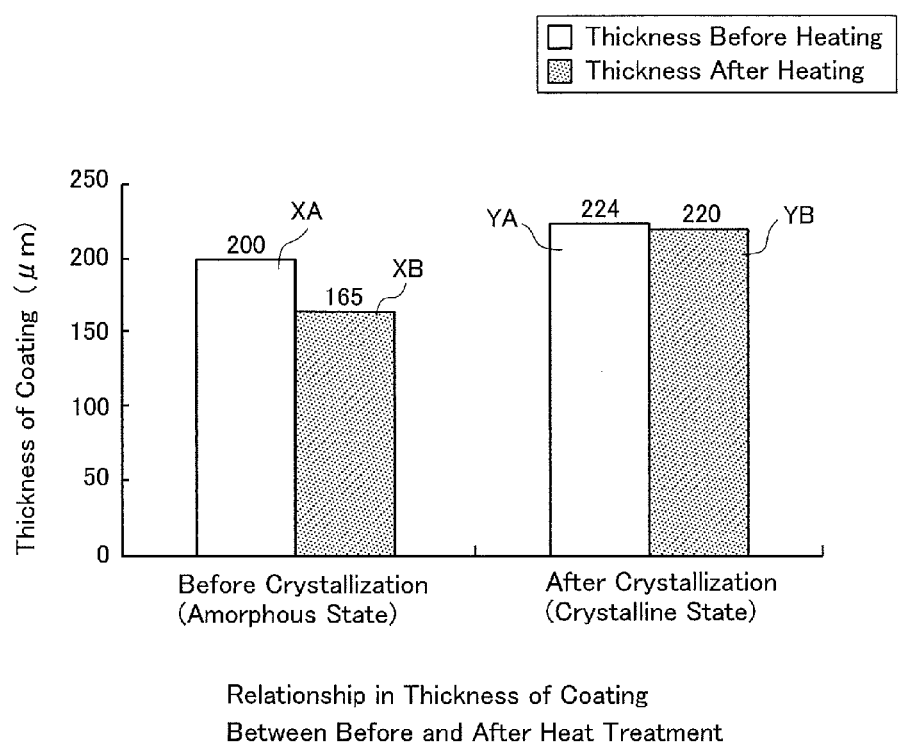
FIG. 14 is a diagram showing a relationship between coating thicknesses before and after heat treatment.

In the present example, however, the in-slot conductor portions 11B are already in the crystalline resin state. The thickness before heating YA=224 μm only decreases to the thickness after heating YB=220 μm as shown in FIG. 14. A decrease ratio of the thickness of the extruded resin coating layer can be reduced to 2% or less, so that sufficient insulation property can be ensured.

All of the in-slot conductor portions 11B of the insulated conductor coil 100 can be rendered into the crystalline resin state. Thus, for example, PPS resin in the crystalline resin state has a higher breakdown voltage by 20% or more than in the amorphous resin state. Furthermore, heat resistance can also be improved. Accordingly, in motor and other products, the breakdown voltage can be increased and heat resistance can be improved.

According to the stator manufacturing method of the present example, as explained in detail above, the stator is manufactured in such a manner that the insulated conductor 11 having the enamel layer on the outer periphery and the extruded resin coating layer on the outer periphery of the enamel layer is deformed into a shape having the straight in-slot conductor portions 11B and the coil end portions 11A with the bent portions to produce the insulated conductor coil 100, and the insulated conductor coil 100 is mounted to a core. The method includes the first step of forming the insulated conductor coil 100 by performing deforming operation to form the bent portions while the extruded resin coating layer of the insulated conductor 11 is in the amorphous resin state, the second step of changing the extruded resin coating layer of the insulated conductor coil 100 into the crystalline resin state by heating the layer to the glass transition temperature or higher, and the third step of mounting the insulated conductor coil 100 to the core. Accordingly, in the deforming operation in the first step, the coil end portions being in the amorphous resin state and thus flexible are less likely to be cracked when the coil end portions are bent.

The method includes a previous step, as a stage before the first step, in which the extruded resin coating layer of the in-slot conductor portions 11B is formed in the crystalline resin state and the extruded resin coating layer of the coil end portions 11A is formed in the amorphous resin state. In the first step, the bent portions in the amorphous resin state are deformed, producing the insulated conductor coil 100. Accordingly, the coil end portions 11A being in the amorphous resin state and hence flexible are less likely to be cracked in bending operation. Furthermore, since the coil end portions 11A are in the amorphous resin state, when the wave winding coils are wound to form the cage-shaped coil having a small coil diameter, there is no possibility that cracks occur in the extruded resin coating layer of the coil end portions 11A.

After the insulated conductor coil 100 is mounted to the stator core, the extruded resin coating layer of the coil end portions 11A is heated to a temperature higher than or equal to the glass transition temperature, thereby changing into the crystalline resin state. Since the in-slot conductor portions 11B are in the crystalline resin state in advance, even when the in-slot conductor portions 11B are heated, the decrease ratio of the thickness of the in-slot conductor portions 11B can be reduced to 2% or less, so that sufficient insulation property can be ensured.

The extruded resin coating layer is heated by the induction coil to change into the crystalline resin state and simultaneously is cooled by the heat sinks or the water jackets 12 to hold the amorphous resin state. This can heat only the in-slot conductor portions 11B without heating the coil end portions 11A, thereby surely changing only the in-slot conductor portions 11B into the crystalline resin state while holding the coil end portions 11A in the amorphous resin state.

Furthermore, the extruded resin coating layer is heated by a laser beam from the laser 20 to change into the crystalline resin state. Accordingly, it is possible to heat only the in-slot conductor portions 11B without heating the coil end portions 11A, thereby surely rendering only the in-slot conductor portions 11B into the crystalline resin state while holding the coil end portions 11A in the amorphous resin state.

A second example of the present invention will be described below. The second example basically adopts the same method in the first example. Thus, the following explanation is made with a focus on differences from the first example without repeating the same contents as in the first example.

Figure 13A:
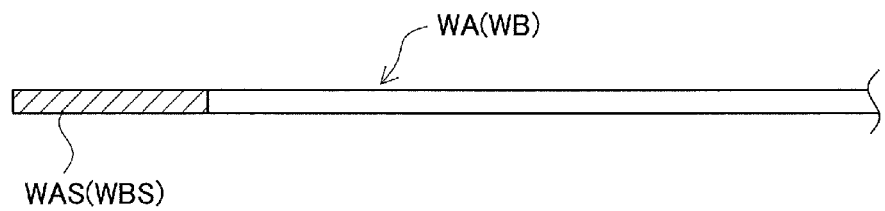
FIG. 13A is a diagram showing that a conductor is subjected to heat treatment for a terminal portion and other portions separately and deformed.
Figure 13B:
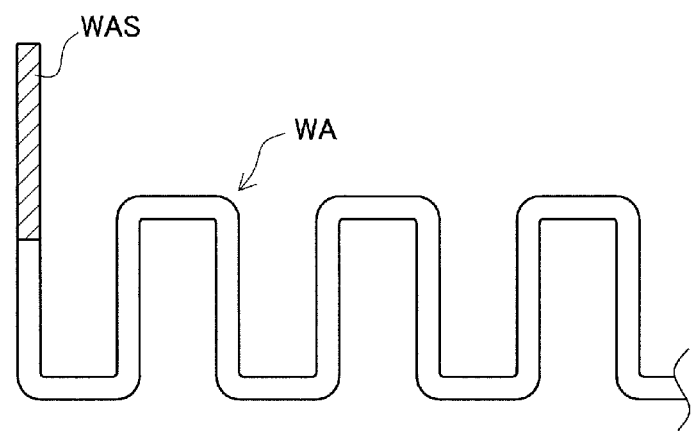
FIG. 13B is a diagram showing that the conductor is subjected to heat treatment different between a terminal portion and other portions and to deforming.
Figure 13C:
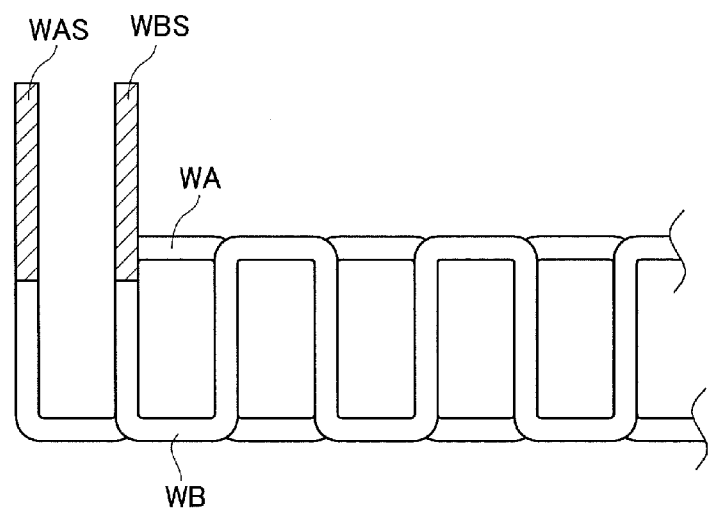
FIG. 13C is a diagram showing that the conductor is subjected to heat treatment different between a terminal portion and other portions and to deforming.

FIG. 12 is a process chart showing the stator manufacturing method in the second example. In the second example, after passing between the straightening rollers, the coil end portions are bent (S3). FIGS. 13A to 13C show the deforming operation. In FIG. 13A, all portions of the extruded resin coating layer on the outer periphery of the conductor WA are in the amorphous resin state. This conductor is deformed into a shape shown in FIG. 13B. Since all portions of the extruded resin coating layer on the outer periphery of the conductor WA are in the amorphous resin state, the conductor can be bent in the amorphous resin state. Therefore, there is no possibility that cracks occur in the extruded resin coating layer formed on the outer periphery of the conductor WA.

A portion other than a terminal portion WAS is then heated. Specifically, by use of the induction heating coil 13 or the laser 20, the extruded resin coating layer of the portion excepting the terminal portion WAS is heated for a predetermined time ranging from several seconds to several tens of seconds to a temperature equal to or higher than the glass transition temperature (S4). In this way, the extruded resin coating layer of the portion of the conductor WA excepting the terminal portion WAS is changed into the crystalline state.

Successively, as shown in FIG. 13C, the wave winding coils WA and WB are wound into a cage shape. The terminal portions WAS and WBS are located upright in the coil end portion.

As shown in FIG. 6, as in the first example, the W-phase wave winding coils WA and WB, the V-phase wave winding coils, and the U-phase wave winding coils are all wound into the cage shape to produce the insulated conductor coil 100. In this state, the terminal portions WAS, WBS, and others of the wave winding coils are located upright in the coil end. A step of winding the insulated conductor coil 100 is an insulated conductor coil assembling step S5.

FIG. 7 shows the stator 10 produced by mounting a split stator core to the insulated conductor coil 100 from its outer periphery and then fitting a shrink fit ring SC to fix the stator core. In this state, the terminal portions WAS, WBS, and others are not sill connected. This step is a core assembling step S6.

Subsequently, even though it is not shown, the terminal portions WAS, WBS and others are subjected to bending operation (S7) and then to heat treatment (S8). Specifically, by using the induction heating coil 13 or the laser 20, the terminal portions WAS and others located outside the stator core are heated to a temperature equal to or higher than about 90° C. which is the glass transition temperature of PPS. Thus, all portions of the extruded resin coating layer of the insulated conductor including the terminal portions WAS, WBS, and others change into the crystalline resin state. Then, a bus bar and external connecting terminals are connected to the terminal portions WAS and others (S9).

According to the stator manufacturing method of the second example as explained above, the second step includes heating a part of the extruded resin coating layer of the insulated conductor other than the terminal portion WAS to the glass transition temperature or higher to change into the crystalline resin state, and the third step includes deforming the terminal portions WAS and others after the insulated conductor coil is mounted to the core, and heating the deformed terminal portions WAS and others to the glass transition temperature or higher, thereby changing into the crystalline resin state. Accordingly, in the deforming operation in the first step, the coil end portions being in the amorphous resin state and thus flexible are less likely to be cracked or broken in bending operation. Since the external terminal portions are in the amorphous resin and thus flexible, when the terminal portions are deformed in the third step, there is not possibility that cracks or breakage occur in the terminal portion when bent.

The present invention is not limited to the above examples and may be embodied in other specific forms without departing from the essential characteristics thereof. For instance, the above examples propose manufacturing the cage-shaped coil using the wave winding coils. As an alternative, the present invention is applicable to usual distributed winding coils and concentrated winding coils.

| REFERENCE SIGNS LIST | |
|---|---|
| 11 | Conductor |
| 11A | Coil end portion |
| 11B | In-slot conductor portion |
| 12 | Water jacket |
| 13 | Induction heating coil |
| 20 | Laser |
| 100 | Insulated coil |

The invention claimed is:

1. A method of manufacturing a stator, the method comprising the steps of:
   providing an insulated conductor coil, the insulated conductor coil produced by:
      providing an insulated conductor;
      forming an enamel layer on an outer periphery of the insulated conductor and forming an extruded resin coating layer on an outer periphery of the enamel layer;
      deforming the insulated conductor into a shape having straight in-slot conductor portions and coil end portions having bent portions to produce the insulated conductor coil;
      forming the extruded resin coating layer of the in-slot conductor portions in a crystalline resin state;
      forming the extruded resin coating layer of the coil end portions in an amorphous resin state, and
      forming the insulated conductor coil by deforming the insulated conductor to form the bent portions while the extruded resin coating layer of the insulated conductor is in the amorphous resin state and by deforming the coil end portions in the amorphous resin state, and
   mounting the insulated conductor coil to a core;
   heating the extruded resin coating layer of the insulated conductor coil to a temperature higher than or equal to a glass transition temperature to render the extruded resin coating layer into the crystalline resin state, and
   assembling the insulated conductor coil to the core.

2. The stator manufacturing method according to claim 1, further including, after mounting the insulated conductor coil to the core, the extruded resin coating layer of the coil end portions is heated to a temperature higher than or equal to a glass transition temperature to render the extruded resin coating layer into the crystalline resin state.

3. The stator manufacturing method according to claim 2, further including heating the extruded resin coating layer by an induction coil to change into the crystalline resin state and simultaneously cooling the extruded resin coating layer by a heatsink or a water jacket to keep the amorphous resin state.

4. The stator manufacturing method according to claim 2, further including heating the extruded resin coating layer by a laser beam to change into the crystalline resin state.

5. The stator manufacturing method according to claim 1, further including heating the extruded resin coating layer by an induction coil to change into the crystalline resin state and simultaneously cooling the extruded resin coating layer by a heatsink or a water jacket to keep the amorphous resin state.

6. The stator manufacturing method according to claim 1, further including heating the extruded resin coating layer by a laser beam to change into the crystalline resin state.

* * * * *